Sept. 24, 1935.  H. A. CEDERSTROM  2,015,100
FREIGHT HANDLING DEVICE
Filed June 6, 1935   3 Sheets-Sheet 1
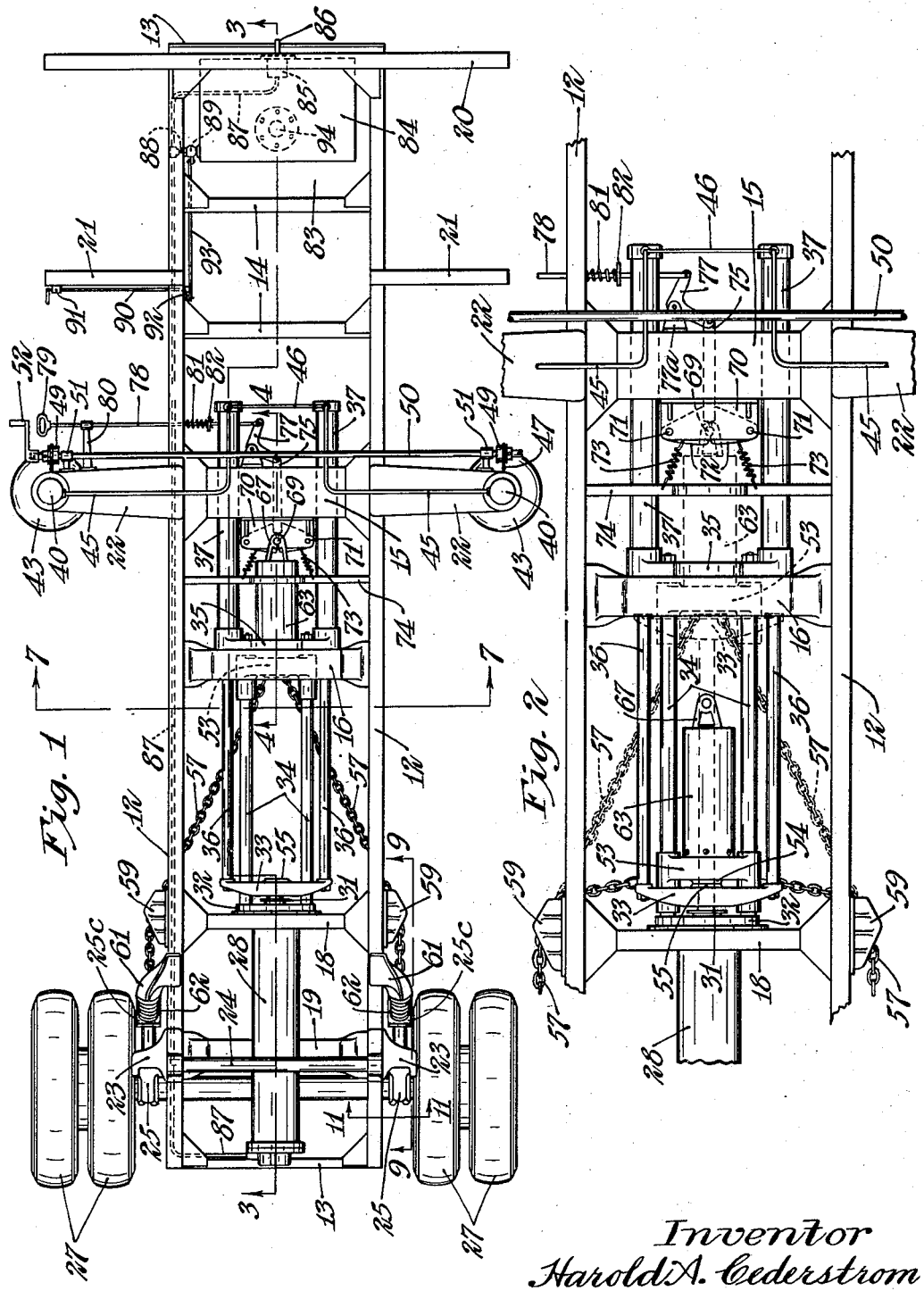
Inventor
Harold A. Cederstrom
By his Attorneys
Williamson & Williamson Sept. 24, 1935.  H. A. CEDERSTROM  2,015,100
FREIGHT HANDLING DEVICE
Filed June 6, 1935   3 Sheets-Sheet 2
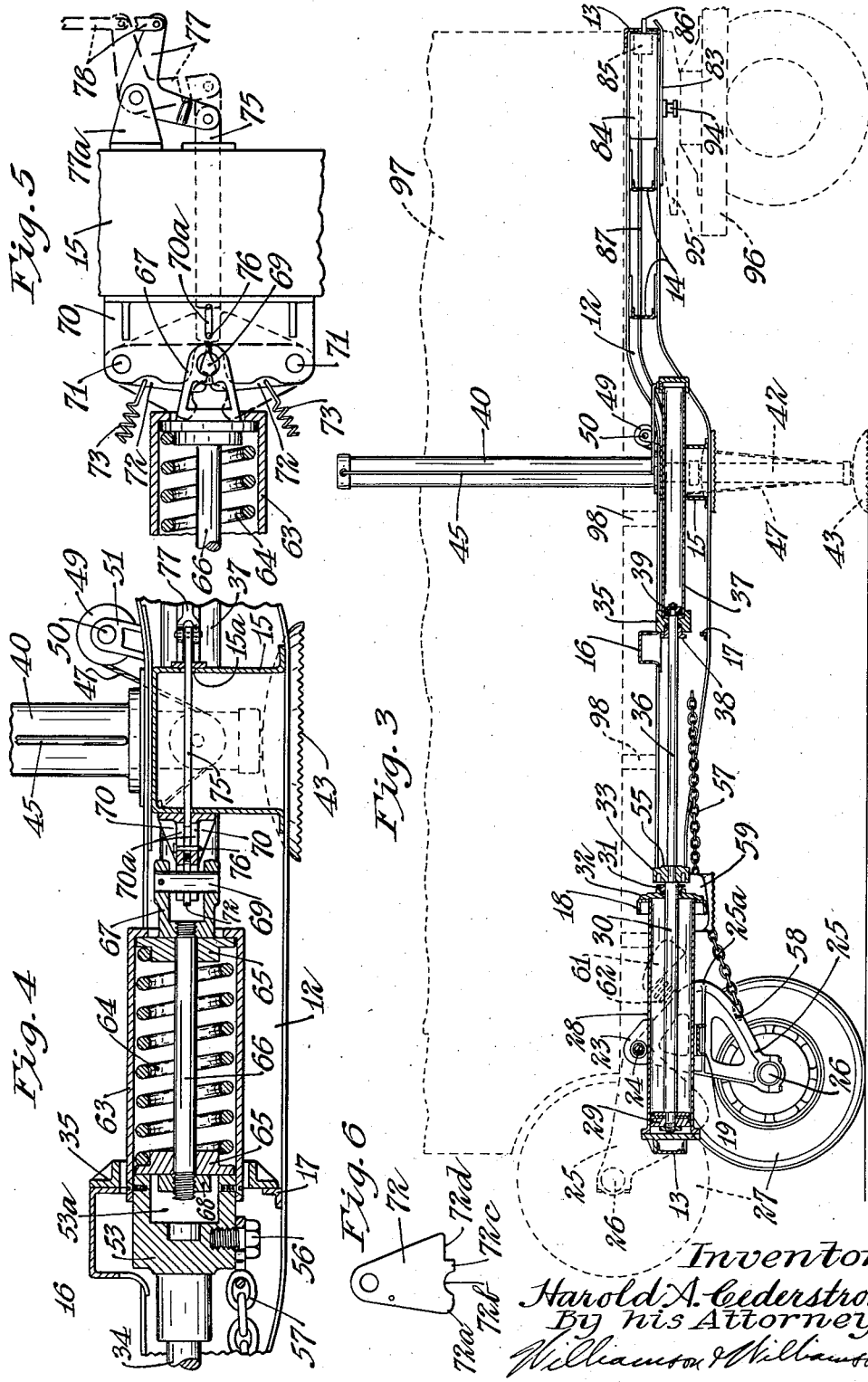
Inventor
Harold A. Cederstrom
By his Attorneys
Williamson & Williamson Sept. 24, 1935.   H. A. CEDERSTROM   2,015,100
FREIGHT HANDLING DEVICE
Filed June 6, 1935   3 Sheets-Sheet 3
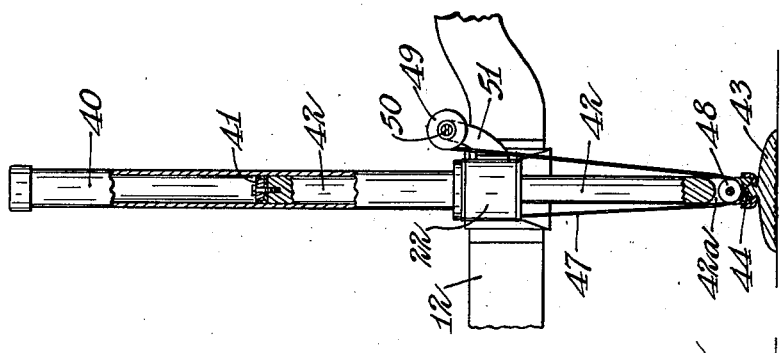
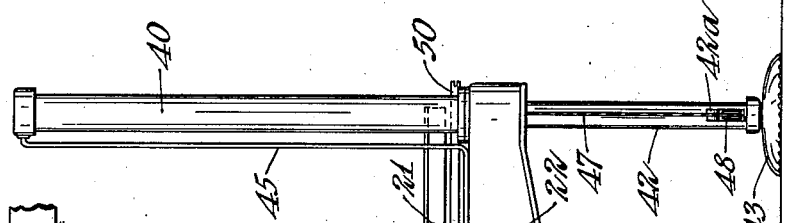
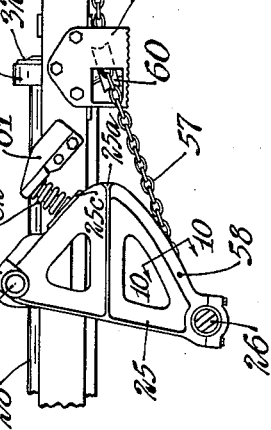
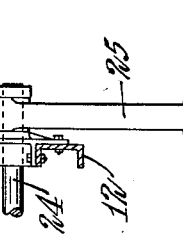
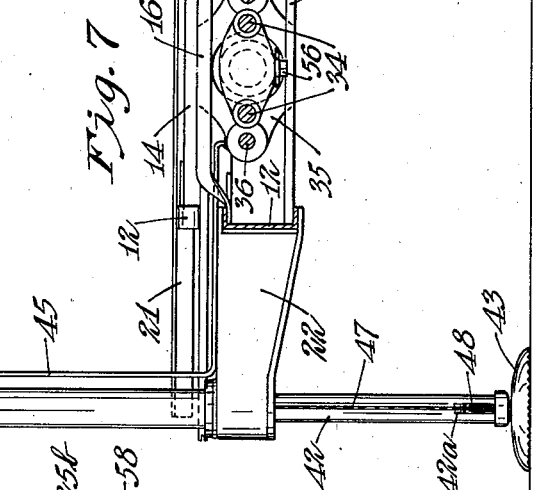
Inventor
Harold A. Cederstrom
By his Attorneys
Williamson & Williamson Patented Sept. 24, 1935

2,015,100

UNITED STATES PATENT OFFICE 2,015,100

FREIGHT HANDLING DEVICE

Harold A. Cederstrom, Minneapolis, Minn.

Application June 6, 1935, Serial No. 25,252

20 Claims. (Cl. 280—33.1)

This invention relates to freight handling devices which, although capable of other use, are particularly applicable for use by railroads to secure the benefits of door to door freight pick-up and delivery service with the economies of rail transportation.

It is the general object of the invention to provide a novel and improved freight carrying trailer, which trailer may be loaded as at the consignor's door without tying up service of a truck during the loading operation, can then be hitched onto a truck, drawn to a railroad yard and there loaded on a flatcar without unloading the freight from the trailer, which trailer after being placed on the flatcar can be unhitched from the truck and then set down on the flatcar so that the frame of the trailer rests directly on the car, whereupon the trailer with its load may be transported by rail to the station of its destination, after reaching which the trailer with its load may be raised from the flatcar, hitched onto a truck, drawn by the truck to its exact destination and there unhitched and unloaded at the door of the consignee of the freight without tying up service of the truck.

More specifically, it is an object of the invention to provide a freight carrying trailer including a frame, a pair of wheels and one or more supports, the wheels and supports being extensible downwardly from the frame to support the vehicle thereby and the wheels and supports being retractable upwardly relative to the frame to allow the frame to lower and permit the entire trailer to be supported as on the ground or on a railroad flatcar from the frame itself.

A further object is to provide such a freight carrying trailer, as referred to in the last above paragraph, with means permitting extension and retraction of the support or supports relative to the frame independently of or in conjunction with the wheels, whereby the trailer can be supported by both the wheels and the support or supports until a truck or other draft vehicle is connected to the trailer and thereafter the supports can be raised to permit the draft vehicle to draw the trailer.

Another object is to provide such a freight carrying trailer including self-contained means for extending and retracting the wheels and support or supports, which self-contained means may be operated as from a power take-off of a truck or other draft vehicle.

Still another object is to provide novel and efficient mechanism for locking a pair of extensible and retractable wheels of a trailer in extended position partially supporting the trailer.

Another object is to provide novel and improved safety devices for use in a trailer having extensible and retractable members connected to a frame, so that either the trailer may be supported by the members or by the frame itself, the safety devices being such that when the trailer is supported by the extensible and retractable members these members cannot be retracted without the application of power as from a power take-off from a truck or other draft vehicle.

One other object is to provide a novel and improved spring mounting for a pair of vehicle wheels.

Other objects and advantages of the present invention will appear from the following description, made in connection with the accompanying drawings, wherein like reference characters refer to the same or similar parts throughout the various views, and, in which, Fig. 1 is a plan view illustrating a chassis of a trailer embodying the invention, the various parts being shown in the position that they will assume when the trailer is ready to be drawn by a truck or other draft vehicle;

Fig. 2 is a similar view of certain parts of the chassis, these parts being shown in full lines as they will appear when the wheels and support are retracted relative to the frame and being shown in dotted lines as they will appear when the wheels and supports are extended from the frame and are in condition to be released for retraction;

Fig. 3 is a vertical section taken on the broken line 3—3 of Fig. 1, the wheels being shown extended from the frame and the supports retracted in full lines and the wheels being shown retracted and the supports extended in dotted lines and portions of a truck and portions of a trailer body being also shown in dotted lines;

Fig. 4 is a vertical section taken substantially on the line 4—4 of Fig. 1, as indicated by the arrows, the parts being shown in enlarged scale;

Fig. 5 is a plan view of certain of the parts shown in Fig. 4, some parts being shown in section and some parts being shown in full lines in one position and in dotted lines in another position;

Fig. 6 is a plan view of one of the locking jaws;

Fig. 7 is a vertical transverse section taken on the line 7—7 of Fig. 1 as indicated by the arrows;

Fig. 8 is a view taken partly in side elevation and partly in vertical section of certain of the parts shown in Fig. 7;

Fig. 9 is a vertical section taken substantially on the line 9—9 of Fig. 1 as indicated by the arrows;

Fig. 10 is a section taken on the line 10—10 of Fig. 9 as indicated by the arrows; and Fig. 11 is a section taken on the line 11—11 of Fig. 1 as indicated by the arrows.

In accordance with the present invention, a freight carrying trailer, technically known as a semi-trailer, is provided. The frame of this trailer, in the illustrated embodiment, is of general rectangular shape and includes a pair of longitudinal frame members 12 of channel-shape in vertical section forming the sides of the frame, and end members 13 interconnecting the longitudinal members in spaced parallel relation. The two frame members 12, as best shown in Fig. 3, have their forward portions located somewhat above the level of their central and rear portions so that the frame is of dropped construction. The longitudinal frame members 12 are securely tied together and braced longitudinally of their length as by forward cross bars 14, a heavy channel-shaped cross bar 15 somewhat rearwardly of the rearmost bar 14, an upwardly bowed cross bar 16 and a bar 17 below bar 16, the bars 16 and 17 being spaced rearwardly from bar 15, a bar 18 spaced somewhat forwardly from the rear end of the frame and a downwardly bowed bar 19 spaced rearwardly of bar 18 and forwardly of the rear end member 13 of the frame. Also carried by the longitudinal members 12 of the frame at their forward ends is a bar 20, which projects outwardly beyond the members 12 and rearwardly spaced from the bar 20 the longitudinal members 12 have secured thereto outwardly extending arms 21. In line with the heavy cross bar 15 outwardly projecting heavy arms 22 are secured to the longitudinal members 12 of the frame.

Mounted on the longitudinal members 12 of the frame near their rear ends are upwardly projecting brackets 23, best shown in Figs. 1 and 11, within which a cross shaft 24 is journaled. The brackets 23 are recessed and fixed to the shaft 24 within the recessed portions of the brackets 23 are heavy swing arms 25 of substantially triangular shape in side elevation, as best shown in Figs. 3, 9 and 11. These swing arms 25 carry at their normally lower ends an axle shaft 26 having spindles (not illustrated) at its ends upon which tire equipped wheels 27 are journaled, the wheels being shown as of the dual type in the drawings. With this construction, it is possible for the swing arms 25 together with the wheels 27 carried thereby to be swung from the full lined position, shown in Fig. 3, to the dotted line position there shown, the full line position being what I hereafter refer to as the extended position of these wheels and the dotted line position being what I hereafter refer to as the retracted position of these wheels, the extension and retraction taking place relative to the frame of the vehicle.

Centrally connected to the rear end member 13 of the frame and to the cross bar 18 is a main cylinder 28 within which a plunger 29 is mounted. A plunger rod 30 is connected to the plunger 29 and works through a packing gland 31 mounted in a plate 32 which closes the forward end of the cylinder 28, is connected to cross bar 18 and extends laterally in both directions from the cylinder 28. The forward end of the plunger rod 30 is connected to a cross head 33 guided for forward and rearward movement by a pair of longitudinally extending rods 34, these rods extending through openings in the cross head. The two rods 34 are anchored at their rear ends in plate 32 and they are mounted at their forward ends in a casting 35 secured to the cross bars 16 and 17 forwardly thereof as best illustrated in Figs. 1, 2, 4 and 7.

In the illustrated embodiment, plunger rods 36 are connected at their rear ends to the ends of the cross head 33 and these two plunger rods 36 run into auxiliary cylinders 37 which extend longitudinally of the frame, are connected at their rear ends to the casting 35 and project forwardly thereof through openings in the heavy cross bar 15. The plunger rods 36 extend through packing glands 38 in the rear ends of the cylinders 37 and they are connected to plungers 39 within these cylinders.

The two heavy outwardly projecting arms 22 have bossed apertures at their outer ends within which the lower ends of upwardly projecting support cylinders 40 are mounted. Within cylinders 40 are plungers 41 to which are connected heavy rods 42 forming with feet 43 extensible and retractable supports or props for the vehicle. The feet 43 are connected to the lower ends of the rods 42 by ball and socket joints 44 and the lower surfaces of the feet 43 are quite large and roughened preferably by cross grooving as indicated. The forward ends of the auxiliary cylinders 37 are connected with the upper ends of the support cylinders 40 by liquid conveying tubes 45 and preferably the forward ends of the two cylinders 37 are interconnected as by a tube 46, so that at all times the pressure will be equalized between the two cylinders 37.

Cables 47, anchored at their one ends to the outer ends of the arms 22, run downwardly under sheaves 48 mounted within recesses 42a near the lower ends of the rods 42 and these cables after passing through the recesses 42a extend upwardly and the upper ends of the cables are wound on drums 49 carried by a transverse drum shaft 50 journaled in brackets 51 carried by the arms 22. A crank 52 is releasably connectible to either end of the drum shaft 50 and when the supports 42—43 are in extended condition, it is under certain circumstances possible to retract these supports by turning the crank 52 and thereby revolving the drum shaft 50 causing the drums 49 to wind additional quantities of the cables 47 thereon to raise the supports 42—43 relative to the frame of the vehicle. In other words, it is possible to retract the supports from the full line position, shown in Figs. 7 and 8 and the dotted line position shown in Fig. 3 to the full line position shown in Fig. 3. In the retracted position the feet 43 of the supports lie approximately flush with the lower part of the frame of the vehicle.

A block 53 extends between the two guide rods 34 for the cross head 33 and this block has large sleeve-like portions through which the two rods 34 extend, so that the block is slidable longitudinally of and is guided by the rods 34. The block 53 has a rearwardly projecting nose 54 which may at times be engaged by a similar forwardly projecting nose 55 on the cross head 33. As best shown in Fig. 4, block 53 carries at its under side a stud 56 which anchors the forward ends of a pair of rearwardly diverging chains 57. As before stated the swing arms 25 are of substantially triangular-shape and they have rounded peaks 25a projecting forwardly when the swing arms are in the position shown in full lines, Figs. 3 and 9. The edges of the swing arms are channeled at 25b from near their lower ends as viewed in Fig. 9 to the peaks 25a for the purpose of receiving the rear portions of the chains 57. These chains at their rear ends are anchored to the swing arms by means of cross pins 58 running transversely of the channels 25b. Heavy recessed brackets 59 are secured in outwardly extending relation to the longitudinal members 12 of the frame adjacent the cross bar 18 and the chains 57 run through the recesses of these brackets and over diagonally set sheaves 60 mounted within the recesses of these brackets. The brackets act as keepers to prevent the chains from running off the sheaves 60. From the above it should be clear that as the block 53 is slid forwardly on the rods 34 from the full line position shown in Fig. 2 to the dotted line position there shown, and if the wheels 27 and swing arms 25 are in the dotted line position shown in Fig. 3 at the beginning of this movement, the block 53 through the medium of the chains 57 will cause the wheels to be carried from retracted to extended position, i. e. to the full line position shown in Fig. 3. Attention should be called to the fact that the under surfaces of the brackets 59 project a short distance below the rear portions of the longitudinal members 12 of the frame to form feet upon which the rear portion of the frame may rest when the wheels are in retracted condition and for this purpose the under surfaces of the brackets 59 are roughened as by cross grooving the same.

Short arms 61 are attached to the longitudinal members 12 of the frame slightly rearwardly from the brackets 59 and these arms carry coil springs 62 which bear against plate-like portions 25c on the swing arms 25 when the swing arms and wheels are extended. These springs 62 therefore act as resilient stops limiting the forward swinging movement of the swing arms 25.

The block 53 is adapted to be resiliently and releasably connected to a fixed part of the frame of the vehicle when the block is in its forward position shown in Fig. 1 and in Figs. 4 and 5, and also in dotted lines Fig. 2. For this purpose the block 53 has connected thereto a cylindrical shell 63 within which is mounted a heavy coiled spring 64. This spring 64 bears at its respective ends against forward and rear spring caps 65 slidably mounted on a rod 66. The rod 66 is received at its rear end within a recess 53a in the forward side of the block 53 and at the rear of the rear cap 65 a nut 68 is connected to the rod 66. The rod 66 is connected at its forward end to a fork 67 working through a slot in the forward and closed end of the shell 63. The arms of fork 67 carry a vertically extending king pin 69. Secured to the rear side of the heavy cross bar 15 are a pair of angular brackets 70 having horizontal flanges in closely spaced parallel relation. These brackets have vertical pivots 71 projecting through their outer rear corners upon which latching jaws 72 are mounted for swinging movement. These latching jaws 72, as best shown in Figs. 4, 5 and 6, are oppositely opposed to each other and as viewed in plan, they are of general triangular shape. The opposing edges of these jaws have rounded rear corners 72a and forwardly of these corners the edges are provided with arcuate notches 72b slightly less than semicircular. Forward of the arcuate notches 72b the opposing edges form projecting fingers 72c and the forward corners of the latching jaws are notched to form notches 72d. Springs 73 connected to the latching jaws 72 and to a cross bar 74 running between the longitudinal frame members 12 normally urge the latching jaws to swing rearwardly on pivots 71 to the position shown in dash lines Fig. 5, this rearward movement being limited by engagement of the forward corners of the latch bars together. When the two jaws are in this rearwardly swung position, the arcuate notches 72b of the opposing jaws are quite widely separated at their rear portions, so that the king pin 69 may be received between these notches. The two fingers 72c however, will be quite close together, so that as the king pin 69 moves into the notches 72b, it will strike these fingers 72c to thereby swing the latching jaws forwardly to the full line position shown in Fig. 5. The notches 72d will then be spaced apart for reception of a locking pin 75 extending longitudinally of the frame and slidably received within slots 15a formed in the heavy cross bar 15. This locking pin is guided for forward and rearward movement by a small vertical pin 76 working within slots 70a in the angular brackets 70. The forward end of the locking pin is pivotally connected to a bell crank lever 77 pivotally mounted on a suitable bracket 77a secured to the bar 15 and the arm of the lever 77 to which pin 75 is not secured is pivotally connected to a rod 78 running laterally to one side of the vehicle, equipped with a handle 79 at its outer end and projecting through a supporting bracket 80 mounted on one of the arms 22. A coiled spring 81 surrounding the rod 78, bears at one end against one of the longitudinal frame members 12 and at its other end against a collar 82 mounted on rod 78 and this spring normally urges the locking pin 75 rearwardly. As a result, when the king pin 69 moves between the two jaws 72 into the arcuate recesses 72b and presses against the fingers 72c to swing the latching jaws 72 somewhat forwardly of the full line position shown in Fig. 5, the locking pin 75 will move into the notches 72d to be received between the two latching jaws 72 and thereby prevent the two latching jaws from being swung rearwardly to release the king pin 69 until such time as the locking pin 75 has been drawn forwardly. Thus if the king pin 69 after being engaged by the latching jaws 72, exerts no pressure against the fingers 72c to hold the latching jaws 72 in forwardly swung position somewhat beyond the position shown in full lines, Fig. 5, the locking pin 75 will be caught between the notched portions 72d of the latching jaws and cannot be withdrawn by pulling the handle 79 of the rod 78. Therefore, the king pin 69 will remain engaged with the latching jaws 72 until the king pin 69 pushes the latching jaws somewhat forwardly from the full line position shown in Fig. 5 to permit the locking pin 75 to be withdrawn from between the jaws by a pull exerted upon the handle 79 of rod 78.

Mounted at the forward end of the frame upon a plate 83 is an oil reservoir 84 within which is mounted an oil pump 85 of any conventional design. This oil pump has a forwardly projecting shaft 86 extending outside the reservoir 84 and a releasable connection to drive this shaft may be had with a flexible shaft (not illustrated) which may be driven in any suitable manner as from the power take-off of a truck or other draft vehicle. The pump 85 driven from the shaft 86 receives from within the reservoir 84 and discharges through a tube 87, which communicates with the rear end of the main cylinder 29. Preferably the major part of the tube 87 is received within the channel of one of the longitudinal frame members 12. A short return tube 88 controlled by a valve 89 connects the tube 87 with reservoir 84. The valve 89 is operated by means of a rod 90 journaled in one of the longitudinal frame members 12 and in a small bracket 91 carried by one of the arms 21, this rod 90 carrying at its inner end a short arm 92 pivotally connected to a longitudinal rod 93, the rod 93 being pivotally connected to the control lever of valve 89.

Plate 83 has a king pin 94 connected thereto and this king pin projects downwardly for releasable connection with a hitch 95 which may be mounted at the rear end of a draft vehicle 96, such as a truck. The hitch 95 and portions of the draft vehicle are shown in dotted lines, Fig. 3 of the drawings.

Any suitable type of body may be mounted on the trailer chassis described. In Fig. 3 there is illustrated a body 97 resting on the bar 20, arms 21, and on cross sills 98 attached to the longitudinal frame members 12. This body 97 may be provided with a straight floor at a single level, the body being recessed at its rear lower portion to receive the wheels 27 when in retracted position.

Operation

Let us assume that it is desired to load freight at the door of a consignor and to ship this freight by rail to a consignee and unload the freight at the door of the consignee. Let us further assume that the trailer stands at the door of the consignor unconnected with a truck or other draft vehicle. Let us further assume that the trailer is supported by the wheels 27 and the supports 42—43, so that the wheels and supports are in downwardly extended relation from the frame of the trailer. Certain of the parts will then assume the dotted line position shown in Fig. 2, while the wheels and parts connected thereto will assume the full line position shown in Figs. 1 and 3 and the supports 42—43 will assume the positions shown in Figs. 7 and 8 and in dotted lines, Fig. 3. The king pin 69 will be locked by the latch bars 72 as shown in Fig. 4, and in full lines Fig. 5 with the recessed portions 72d of the latch bars tightly gripping the locking pin 75 to prevent release of this pin if through mistake or intentional mischief the handle 79 of the rod 78 should be pulled. The wheels 27 and the supports 42—43 will stably support the trailer with the frame raised from the ground, so that the body 97 of the trailer may be loaded at the convenience of the consignor at his door step without tying up service of a truck or equivalent draft vehicle during the loading operation. The consignor will then load the freight that he desires to ship on the trailer, packing it as he sees fit for shipment. When the trailer is fully packed, the service of a truck or other draft vehicle will be employed for drawing the trailer to a railroad station and loading it onto a flatcar.

The truck, equipped with the ordinary trailer hitch 95, will be backed up to the trailer and the hitch 95 of the truck will be connected with the king pin 94 in the usual manner, so that the trailer is partially supported by the rear wheels of the truck. The crank 52 will then be connected with the drum shaft 50 and the valve 89 will be opened, whereupon the crank 52 will be turned to wind additional quantities of the cables 47 onto the winding drums 49. This will cause the supports 42—43 to raise whereby the plungers 41 will force oil from the upper portions of the support cylinders 40 through the tubes 45 into the forward ends of the auxiliary cylinders 37. Oil entering the auxiliary cylinders 37 will force the plungers 39 rearwardly, thereby carrying the plunger rods 36, cross head 33, and plunger rod 30 rearwardly. The plunger 29 will be moved rearwardly in main cylinder 28 with the plunger rod 30 and oil will thus be forced from the rear end of main cylinder 28 through tube 87, tube 88 and valve 89 into the reservoir 84. At length, the various parts will assume the position shown in Fig. 1 with the supports 42—43 retracted to the position shown in Fig. 3, in full lines. The valve 89 will then be closed by turning the rod 90 to thereby prevent the return of oil to the rear end of the main cylinder 28 and consequently the supports 42—43 will be retained in retracted condition.

The trailer will now be drawn by the truck to the railroad yard. As the rear wheels 27 of the trailer pass over bumps, their action will be cushioned by the spring 64. As the wheels strike a bump, the wheels together with the swing arms 25 will tend to swing rearwardly thereby drawing more tightly on the chains 57 tending to move block 53 and cylindrical shell 63 rearwardly. As the forward end of the shell 63 bears against the forward spring cap 65, while the rear cap 65 bears against the nut 68, while the rod 66 is connected to the fork 67, it will be seen that the spring 64 will yieldingly cushion the rearward swinging movement of the wheels 27 and swing arms 25 to absorb the shock imparted thereto by the bump. Also as the wheels and swing arms swing rearwardly relative to the frame of the vehicle when a bump is struck, the shock imparted to the tires will be cushioned so that the wear on the tires is but slight compared to that with the ordinary type of vertical spring mounting for the rear wheels of a vehicle. Of course, if brakes are applied to the wheels 27, which is possible, but not illustrated in the drawings, the wheels and swing arms will swing somewhat rearwardly against the tension of the spring 64 as the brakes are applied so as to effect a gradual slowing down of the wheel travel relative to the surface over which the wheels move. The springs 62 snub the forward swinging movement of the wheels 27 and swing arms 25 after the wheels have passed over a bump and they also act to cushion shocks imparted to the wheels in case the wheels should strike bumps or curbs while the trailer is being backed.

After the loaded trailer has been drawn by the truck to the railroad yard, the trailer is backed off a platform directly onto a flatcar. When the trailer is properly located on the flatcar, the flexible shaft driven from the power takeoff of the truck is again connected to the pump shaft 86 and the pump 85 is driven to force oil from the reservoir 84 through the tube 87 into the rear end of the main cylinder 28. At the beginning of this action, the parts are in the position shown in Fig. 1 and in full lines Fig. 3 with the truck still connected through the hitch 95 and king pin 94 with the trailer. Oil entering the rear end of the main cylinder 28 forces the plunger 29, plunger rod 30, cross head 33, plunger rods 36 and plungers 39 forwardly. The plungers 39 force oil from the rear portion of the auxiliary cylinders 37 through the tubes 45 into the upper ends of the support cylinders 40, thereby forcing the plungers 41 downwardly to extend the supports 42—43, until the feet 43 strike the top of the flatcar. The truck may then be unhitched from the trailer whereupon the trailer will be supported by the wheels 27 and the supports 42—43.

It is now desired to retract the wheels 27 and supports 42—43 so as to set the trailer down on the flatcar with the frame of the trailer resting directly on the flatcar. The flexible shaft driven from the power take-off of the truck is again connected to the pump shaft 86 and the pump 85 is driven to thereby force a slight additional quantity of oil into the main cylinder 28. The cross head 33 is thus forced forwardly a short distance beyond the dotted line position shown in Fig. 2, carrying the block 53 with it to compress the spring 64 additionally and force the king pin 69 somewhat forwardly to carry the latching jaws 72 somewhat forwardly beyond the position shown in Figs. 4 and 5. Thereupon the handle 79 of rod 78 will be grasped and pulled to withdraw the locking pin 75 from between the two notched portions 72d of the latching jaws, this action being permitted by reason of the loosening of the latching jaws on the locking pin 75 through the forward movement of the latching jaws past the full line position shown in Figs. 4 and 5. At the same time that the pin 75 is withdrawn the valve 89 is opened by turning the rod 90. Oil is now permitted to flow back into the reservoir 84 from the main cylinder 28 through the tube 87, tube 88 and valve 89. The weight of the trailer together with its load permits the frame of the trailer to gradually settle down onto the flatcar while the supports 42—43 and wheels 27 and swing arms 25 move to retracted position. In other words, the weight of the trailer and load pressing on the supports 42—43 causes these supports to raise, thereby forcing oil from the upper parts of the support cylinders through the tubes 45 into the forward ends of the auxiliary cylinders 37 to move the rods 36 rearwardly and cross head 33 therewith. Movement of the cross head 33 rearwardly forces plunger rod 30 and plunger 29 rearwardly to force the oil out of the rear end of the main cylinder 28. As the cross head 33 moves rearwardly the block 53 follows the cross head and assists the movement of the cross head by reason of the weight imposed upon the wheels 27. In this connection it should be noted that when the wheels are in extended position, the center of the axle shaft 26 is to the rear of the center of the shaft 24, so that the tendency is for the wheels to move rearwardly rather than forwardly as the king pin 69 is released from its engagement with the latching jaws 75. Eventually the frame of the vehicle will drop downwardly on the flatcar until the trailer is supported directly by the frame from the feet 43 and the feet formed by the brackets 59. The parts illustrated in Fig. 2 will then assume the position shown in full lines in that view of the drawings, while the supports 42—43 will assume the position shown in full lines in Fig. 3, and the wheels and swing arms will assume the position shown in dotted lines, Fig. 3.

When the trailer is in the position last described on the flatcar, the center of mass of the trailer and its load is low on the car and the feet 43 and the feet of the brackets 59 will securely maintain the trailer in position on the flatcar when the flatcar is in motion. The trailer is of such size that two or more trailers with their loads may be transported on a single flatcar. The flatcar carrying the trailer will now be drawn by rail to the station of destination of the consignee, whereupon the trailer may be unloaded from the flatcar.

In unloading the trailer from the flatcar, a flexible shaft driven from a power take-off of a truck at the station of destination is connected to the pump shaft 86 to place pump 85 in operation. This pump will then force oil from the reservoir 84 through the tube 87 into the rear end of main cylinder 28, thereby forcing plunger 29, plunger rod 30, cross head 33, plunger rods 36, plungers 39, block 53, and king pin 69 forwardly. By this action the wheels 27 are carried from retracted to extended position, while the supports 42—43 are carried from retracted to extended position by the forcing of oil from the forward ends of auxiliary cylinders 37 into the upper ends of support cylinders 40. Finally the king pin 69 will be thrown into engagement with the latching jaws 75, as has been previously described, and the locking pin 75 will move between the notched portions 72d of these jaws, all as has been previously described, to thereby resiliently lock the block 53 to a fixed portion of the frame. Of course, as the wheels and supports 42—43 move to extended position, the frame of the trailer together with its load is raised from the floor of the flatcar to raised position therefrom. It will be understood that during this action the valve 89 remains closed.

A truck can now be connected to the trailer as previously described, the supports 42—43 may be raised as previously described and the trailer may then be drawn by the truck to the door of the consignee. The supports 42—43 may then be extended in the same manner as described in connection with the loading of the trailer on the flatcar, whereupon the truck may be unhitched and driven away. The trailer may be then unloaded by the consignee at his door without tying up service of the truck. If it should be found desirable for unloading to drop the frame of the trailer onto the ground, this may be conveniently done as previously described in connection with the dropping of the trailer frame on to the flatcar.

Of course, it is possible to extend or retract the wheels 27 and the supports 42—43 to greater or less degree so as to support the frame of the trailer at any desired level for loading and unloading operations. It will also be seen that when the trailer is disconnected from a truck, it is possible to retract the supports 42—43 while maintaining the wheels 27 in extended position, so that the forward end of the trailer may be dropped to the ground while the rear end remains in extended position. This may be desired at times for convenience in loading and unloading operations. Also when the trailer is hitched onto the rear end of a truck or draft vehicle, it is possible to retract the wheels 27 together with the supports 42—43 so as to lower the rear part of the trailer to the ground while the front part of the trailer is supported by the rear wheels of the truck. This may be also desirable at times.

While it is preferable to use two supports 42—43 in conjunction with the wheels to better stabilize the trailer when the supports are extended, it will be appreciated that one support only may be used if desired. When the two supports are used, it is preferable in the construction disclosed to interconnect the two auxiliary cylinders 37 as by the tube 46 so as to equalize the pressure between these two cylinders 37 and also between the support cylinders 40. It will be understood that many other mechanisms may be provided than that illustrated for forcing fluid into the upper ends of the support cylinders 40 as fluid is forced into the rear end of the main cylinder 28 and vice versa.

The downward and upward swing of the swing arms 25 is so calibrated relative to the downward and upward movement of the supports 42—43, that as the wheels and supports move downwardly or upwardly together, the bottom surfaces of the wheels and supports maintain approximately the same spacing from the frame of the trailer so that the trailer does not tilt to an appreciable extent fore and aft.

While in the illustrated embodiment, the wheels and supports are extended and retracted by use of hydraulic mechanisms, it will be understood that other fluid type mechanisms such as pneumatic mechanisms may be used for the purpose or, if desired, the action may be accomplished by other mechanical means.

While the trailer of the invention is particularly adapted for use in connection with rail service in transporting freight, it is capable of use in many other connections.

It will, of course, be understood that various changes may be made in the form, details, arrangement and proportions of the various parts without departure from the scope of the present invention, which, generally stated, consists in the matter shown and described and set forth in the appended claims.

What is claimed is:—

1. A freight carrying trailer having in combination a frame, a pair of wheels connected to said frame for extension downwardly and for retraction upwardly relative thereto, a support connected to said frame in longitudinally spaced relation from said wheels for extension downwardly and for retraction upwardly relative to the frame, a hitch connection mounted on said frame and means for extending and retracting said wheels and said support relative to said frame.

2. A freight carrying trailer having in combination a frame, a pair of wheels connected to said frame for extension downwardly and for retraction upwardly relative thereto, a support connected to said frame in longitudinally spaced relation from said wheels for extension downwardly and for retraction upwardly relative to the frame, and means operating under fluid pressure and mounted on said frame for extending and retracting said wheels and said support relative to the frame.

3. A freight carrying trailer having in combination a frame, a pair of wheels connected to said frame for extension downwardly and for retraction upwardly relative thereto, a support connected to said frame in longitudinally spaced relation from said wheels for extension downwardly and for retraction upwardly relative to said frame, a hitch connection mounted on said frame and hydraulically operating means mounted on said frame for extending and retracting said wheels and said support relative to the frame.

4. A freight carrying trailer having in combination a frame, a pair of wheels connected to said frame for extension downwardly and for retraction upwardly relative thereto, a support connected to said frame in longitudinally spaced relation from said wheels, for extension downwardly and for retraction upwardly relative to the frame, means for simultaneously extending both said wheels and said support and permitting simultaneous retraction of both said wheels and said support, means for retaining said wheels in extended condition and means for retracting said support independently of said wheels while said wheels are in retained extended condition.

5. A freight carrying trailer having in combination a frame, a pair of wheels connected to said frame for extension downwardly and for retraction upwardly relative thereto, a support spaced longitudinally of the frame from said wheels and connected to the frame for extension downwardly and for retraction upwardly relative thereto, means for simultaneously extending both said wheels and said support and permitting simultaneous retraction of both said wheels and said support, means for locking said wheels in extended condition, means for retracting said support independently of said wheels while said wheels are in locked extended condition, said first mentioned means and said locking means being cooperatively constructed and arranged to permit retraction of said wheels only when said support is in extended condition and as the support is simultaneously retracted.

6. A freight carrying trailer having in combination a frame, a pair of wheels connected to said frame for extension downwardly and for retraction upwardly relative thereto, a support connected to said frame in longitudinally spaced relation from said wheels for extension downwardly and for retraction upwardly relative to the frame, a member movable from a first position to a second position to extend said wheels, mechanism for retaining said member in its second position, means movable from a first position to a second position to extend said support, said means, when said member is in its first position, acting to move said member with said means from said member's first position to its second position and said means, when said member is in its second position, being independently movable between the first and second positions of said means.

7. The structure defined in claim 6, said means being movable to a third position to permit release of said retaining mechanism and means for releasing said retaining mechanism when said first mentioned means is in its third position whereby said member may then move with said means from second position to first position.

8. The structure defined in claim 6, said means being hydraulically operated.

9. A freight carrying trailer having in combination a frame, a pair of wheels swingably connected to said frame for extension downwardly and for retraction upwardly relative thereto, a support connected to said frame in longitudinally spaced relation from said wheels for extension downwardly and for retraction upwardly relative to the frame in a substantially vertical direction and means mounted on said frame for extending and retracting said wheels and said support in such manner that as said wheels and support are extended downwardly below the frame substantially equal spacing is always maintained between the frame and the lower parts of said wheels and between the frame and the lower part of the support to prevent tilting of the frame to any substantial degree.

10. A freight carrying trailer having in combination a frame, a pair of wheels connected to said frame for extension downwardly and for retraction upwardly relative thereto, a support connected to said frame in longitudinally spaced relation from said wheels for extension downwardly and for retraction upwardly relative to the frame, a sliding block, means interconnecting said block and said wheels for extending said wheels as said block slides in a first direction and for permitting retraction of said wheels as said block slides in a second direction, a hydraulically operated head movable in the same directions as said block, means operated by the movement of said head for extending said support as said head moves in the first direction and for retracting said support as said head moves in the second direction, means for retaining said block near its limit of movement in the first direction, said head acting to move said block in the first direction but said head being movable in both directions independently of said block when said retaining means holds said block.

11. A freight carrying trailer having in combination a frame, a pair of wheels connected to said frame for extension downwardly and for retraction upwardly relative thereto, a support connected to said frame in longitudinally spaced relation from said wheels for extension downwardly and for retraction upwardly relative to the frame, a block mounted for forward and rearward movement on the frame, means interconnecting said block and said wheels for extending said wheels as said block moves forwardly and for permitting retraction of the wheels as the block moves rearwardly, a head mounted on said frame behind said block for forward and rearward movement, hydraulic means for operating said head and means for extending said support as said head moves forwardly and for retracting said support as said head moves rearwardly.

12. The structure defined in claim 11, and latching means for latching said block when in forward position.

13. The structure defined in claim 11, latching means for latching said block in forward position and mechanically operating means for retracting said support and moving said head rearwardly.

14. The structure defined in claim 11, said wheels being swingably mounted, a latching mechanism mounted on said frame, and a member resiliently connected to said block and engageable by said latching mechanism when said block is forwardly extended.

15. A vehicle having in combination a frame, a swing arm pivotally connected to said frame and normally projecting below the same for rearward and upward swinging movement, a shaft carried by said swing arm, a wheel mounted on said shaft, a flexible member connected at its rear end to said swing arm and projecting forwardly therefrom, a block to which the forward end of said flexible member is connected and a resilient connection between said block and a fixed portion of said frame.

16. A trailer having in combination a frame, a pair of wheels swingably connected to said frame for extension downwardly below the same and for retraction upwardly relative to the frame, a support mounted in said frame for extension below the same and for retraction upwardly relative thereto, a sliding block mounted on said frame for forward and rearward movement, flexible means interconnecting said wheels and block for extending said wheels as said block moves forwardly, a head mounted on said frame behind said block for forward and rearward movement and adapted to carry said block, when rearwardly slid, forwardly with the same, hydraulic means for moving said head forwardly and rearwardly, means for locking said block when in forwardly slid relation and hydraulic means operated by movement of said head to extend said support as said head moves forwardly and to retract said support as said head moves rearwardly.

17. A trailer having in combination a frame, a hitch connection at the forward end of the frame, a pair of wheels swingably mounted at the rear of the frame for extension downwardly from the frame as the wheels swing downwardly and forwardly and for retraction upwardly relative to the frame as the wheels swing upwardly and rearwardly, a support mounted on said frame in forwardly spaced relation from said wheels, said support being extensible downwardly below the frame and being retractible upwardly relative to the frame, a block mounted in said frame for sliding forward and rearward movement, flexible members connecting said wheels with said block, a latch member carried by said block, latching mechanism engageable with said latch member when said block is slid to its forward position, means for disengaging said latching mechanism from said latch member, a head mounted on said frame behind said block and movable forwardly and rearwardly, said head being engageable with said block to carry the block from rearward to forward position with said head, hydraulic mechanism for moving said head forwardly and rearwardly and means operated from said head for extending said support as said head moves forwardly and for retracting said support as said head moves rearwardly.

18. The structure defined in claim 17, said block being connected to said latch member by yielding resilient connection.

19. The structure defined in claim 17, and independent means for retracting said support to move said head rearwardly.

20. A vehicle trailer having in combination a frame, means at the forward part of the frame for connecting the same to a draft vehicle, a wheel carrying axle shaft swingably mounted at the rear of the frame for extension downwardly and forwardly below the frame and for retraction upwardly and rearwardly relative to the frame, a support mounted on said frame forwardly of said axle shaft for extension below the frame and for retraction upwardly relative to the frame, an hydraulic cylinder mounted on said frame, a liquid reservoir, a pump receiving from said reservoir and connected to one end of said cylinder, means permitting the return flow of liquid from said cylinder to said reservoir, a plunger mounted within said cylinder, a plunger rod connected to said plunger, a head connected to said rod for reciprocatory movement in a forward and rearward direction, a block mounted forward of said head and in the path thereof for forward and rearward movement, a flexible connection between said axle shaft and said block, latching means for retaining said block in forwardly extended position and means operated from said head for extending and retracting said support.

HAROLD A. CEDERSTROM.